Patented Mar. 18, 1930

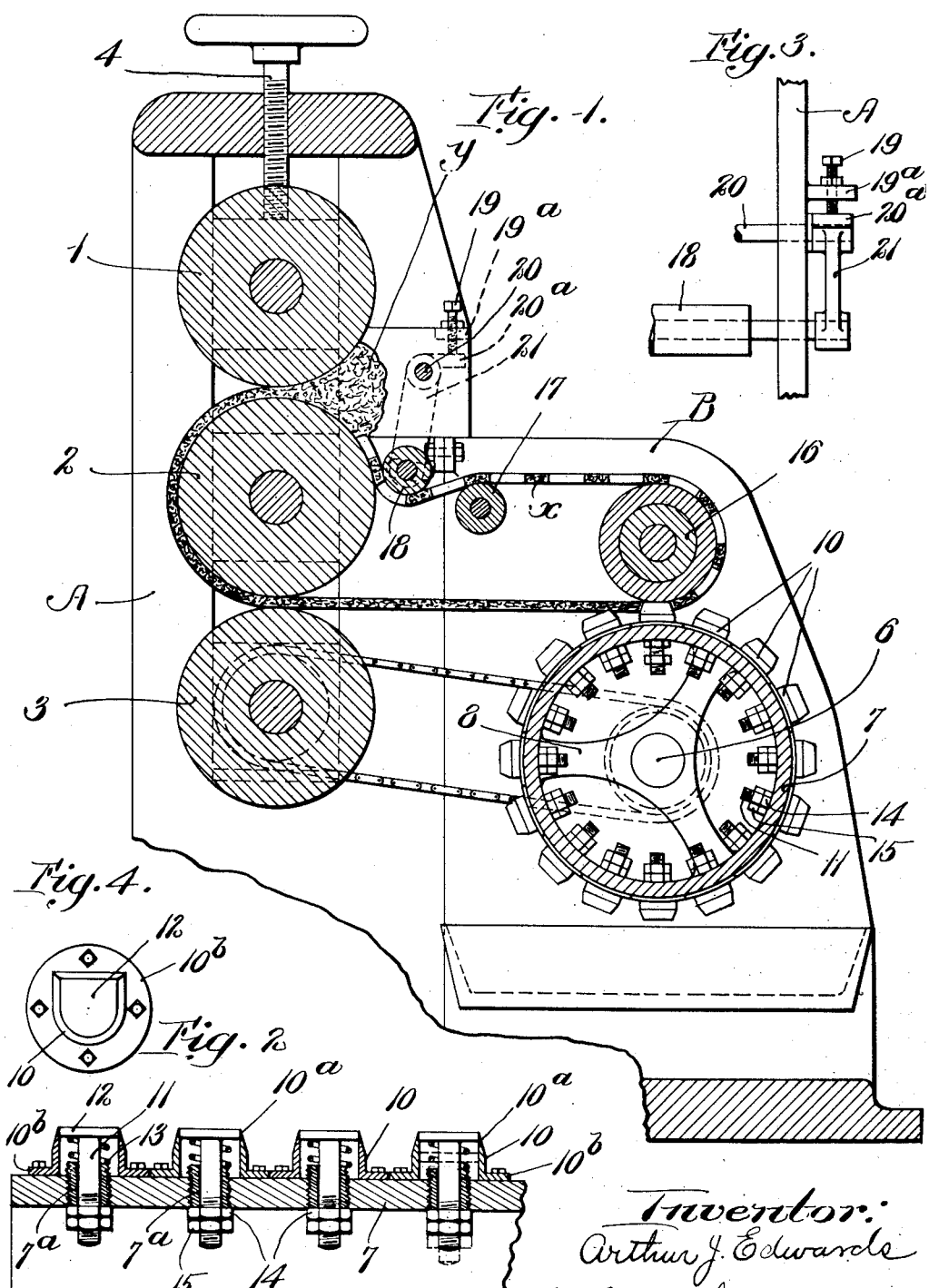

1,750,708

UNITED STATES PATENT OFFICE

ARTHUR J. EDWARDS, OF CAMBRIDGE, MASSACHUSETTS, ASSIGNOR OF ONE-HALF TO GEORGE N. GODDARD, OF NEWTON, MASSACHUSETTS; PATRICK F. EDWARDS ADMINISTRATOR OF SAID ARTHUR J. EDWARDS, DECEASED.

MEANS FOR DIEING-OUT RUBBER HEELS

Application filed June 11, 1926, Serial No. 115,401. Renewed July 3, 1928.

In the manufacture of rubber heels or the like it has been the practice heretofore to roll out, from the mass of hot plastic rubber composition, sheets rather more than one-half inch thick, out of which, when set or cooled, the heel blanks are cut out by cutting dies of appropriate size and shape. These blanks are then placed in their corresponding moulds for vulcanization. Instead of using hand dies for blanking, a die press, similar to that shown in United States Patent 1,522,795, is sometimes used.

Such prior art practices, however, are open to serious practical objections. The cooled calendered sheet or strip is quite hard and resistant to the cutting edges of the die which require frequent sharpening. There is also a lack of uniformity in the mass or quantity of material cut out from the same sheet by the same die since the sheets of this stock vary in thickness, besides often being quite lumpy. Where a presser foot is used, as in the patent above referred to, the lumps may be temporarily compressed by it, but on the withdrawal of the die and the lifting of the presser the lump re-appears as a hump or irregularity in the surface which has to be trimmed off even before such heels can be sold as "seconds" or "thirds." Moreover, to prevent sticking of the blanks, the sheet or strip must be dusted with soap-stone which frequently leaves white streaks in the blank, producing inferior heels.

A careful consideration of these and other difficulties in this art have led me to devise a new method and apparatus useful for commercial practice of this art in order to produce blanks for heels or the like of uniform mass, while avoiding the losses, waste and imperfections of work incident to the practice heretofore in vogue in this art, besides enormously reducing the labor cost of producing blanks of this class.

According to my present improvement in this art I die out the heel blanks from sheets of rubber as they come from the calender rolls while in a hot plastic condition, and the machine or apparatus devised for practicing this method embraces, generally speaking, in combination with a revolving bed-roll, a plurality of revolving dies whose cutting edges are arranged to form a rolling contact with the periphery of the bed-plate or platen, over which the interposed sheet of plastic rubber travels, and means inside said die for exerting a yielding pressure against the exposed area of the sheet entering the die for compressing the entire mass of plastic material inside the die with a yielding pressure whereby the available space inside the die is completely filled with the plastic mass under a predetermined pressure, while any surplus above the required quantity of material can be squeezed out beneath the rearward edge of the die, thus insuring absolutely uniform quantity of material whose compression is uniform and is also sufficient to obviate shrinkage in the vulcanizing mould for which the heel blank is destined.

Since the blanks are cut out from the rubber while in a hot plastic condition, the waste portion or residue of the sheet remaining, after the blanks have been cut out, may be carried back and forced into the intake of the calender rolls where it becomes mingled with the mass of plastic rubber supplied to the rolls for the purpose of forming the sheets.

These and other features characterizing my invention will be more particularly described in the following specification and will be defined in the claims annexed.

In the accompanying drawings:

Figure 1 shows an elevation in central section of my improved blank-forming attachment applied to a usual set of calendering rolls.

Figure 2 is a detail showing, on an enlarged scale in central cross section, a series of blank-cutting dies mounted in a revolving drum with the blank-compressing and blank-expelling members mounted therein.

Figure 3 is a detail showing, in front elevation, the means for supporting and adjusting the roll that presses the sheet scrap against the calendering roll in order to return it to the plastic mass being acted upon by the rolls.

Figure 4 is a plan view of a die and its plunger.

According to the usual practice, a train of calendering rolls comprises an upper roll 1, an intermediate roll 2, and a lower roll 3, commonly mounted in a vertical arrangement with provision for adjusting the rolls, in the usual manner, by adjusting screws 4, or equivalent means. This, by itself however, does not form the novel part of my present invention but is the arrangement with which my improvement or attachment is associated.

In the form actually shown, my invention is illustrated as an attachment having a suitable frame B adapted to be placed against or secured to the usual frame A of a calendering machine. In this frame B is mounted a rotary shaft 6, for supporting a rotary drum or cylinder 7, by means of supporting spiders 8, which leave access to the interior of the drum.

Around the periphery of the drum 7 is mounted a series of any desired number of blanking dies 10. These blanking dies 10 are shaped to correspond in contour to the shape and size of the heel-blank or sole-blank which it is desired to cut out. They are sharpened to a thin cutting edge $10^a$, and are preferably provided with flanges or ears $10^b$, by which they may be bolted or fastened to the outer face of the drum 7.

Assuming the dies to be arranged in longitudinal rows parallel with the axis of the shaft 6, there will also be bored a series of radial holes $7^a$, through the wall of the drum to permit the passage of reciprocatory shanks or pins 11, carrying, at their outer ends, heads 12, corresponding to the interior form of the die and constituting plungers for receiving the inward pressure of the rubber sheet, during the cutting operation, and later expelling the blanks automatically from the heel-cutting dies. Around each shank or pin, inside of the plunger head 12, is disposed a coiled compression spring 13, which normally forces the plungers outwardly. The inner ends of the pins or plungers 11 are provided with stop members which are preferably adjustable in order to permit variation in the tension or degree of compression of the springs 13.

In the form illustrated, said stop members comprise adjustable tubular externally threaded nuts 14 for receiving the thrust of compressed springs 13, and stop nuts 15 having internal threaded engagement with the plunger pins or shanks 11. By adjusting the tubular nuts or sleeves 14, the degree of compression of the springs 13 may be varied, while the stop nuts 15 may also be adjusted to determine the limit of outward movement of the plungers.

It will be understood that the blanks are cut out from a sheet of rubber while still in a plastic condition and that the compression is exerted upon the blanks confined in or bounded by the die as the subtending blank forces the plunger inward against the pressure of the spring. In this way the blank is compressed while in a plastic condition and while confined by the die so that the plastic blank is condensed or closely consolidated without change or distortion of its contour or form since no lateral spreading of the confined plastic body inside the die can take place. Such a blank will not be subject to any objectionable shrinkage on cooling and contains precisely the required quantum of rubber.

The pressure can be made uniform and as the plunger can be given a definite or predetermined range of movement, by reason of its adjustment, a uniform quantity of rubber is cut out on each operation of the die, any surplus amount being forced by the resistance of the plunger to flow laterally outside the cutting edge of the die when the rubber inside the die reaches the maximum compression allowed by the spring.

Opposed to the die-cutting drum is a bed-roll 16 whose axis is parallel to that of the drum 7, said bed-roll having preferably a layer of rubber, or other relatively soft material, so as to avoid dulling the cutting edges $10^a$ of the blanking dies.

In the present arrangement the bed-roll is shown arranged above the blank in close proximity to the line of travel of the cutting edges of the dies so that the dies will have a rolling surface to contact therewith after cutting through the sheet rubber.

The bed-roll 16, against which the cutting edges of the cutting dies 10 are opposed or presented as they revolve around their axis is, in this instance, located above the die-carrying drum, the surface of said roll preferably being covered with a layer of rubber or other material that is not hard enough to dull the cutting edges of the dies. The bed-roll requires no driving gears and may be operated as an idler roll. The punched out net work of the scrap, shown at X, passes around the front of the bed-roll and over an idler or supporting roll 17, thence preferably underneath a roll 18, which is supported by depending pivotal arms 21, carried by a transverse rod or shaft 20, extending from one side frame A of the machine to the other. This roll is held in position to press the rubber scrap against the adjacent calender roll 2, by which it is fed back into the mass of plastic rubber Y, which forms the material upon which the calender rolls operate to produce sheets of required thickness. To maintain the guide roll 18 in proper position, adjusting screws 19 are mounted on the inside faces of the frame A, with their lower ends thrusting against a short arm $20^a$ of the supporting pivotal arms 20, said screws being passed through inwardly projecting lugs $19^a$ of the frame. Said guide plates 21, for confining the plastic mass within the proper width dimensions, are mounted on the shaft 13

20 with their inner ends extending in toward the bite of the rolls 1 and 2.

While I have not thought it necessary to show all details of the calender, which is an old construction, it will be understood that the calender roll may be set to deliver sheets of different thicknesses. Furthermore, by reason of the adjustment provided for the plungers, the setting of the plungers may be accommodated to different thicknesses of the plastic sheet presented to the dies for the blanking operation. After the die has cut out its heel blank and has revolved away from the bed roll 16, the plunger is free to return to its outer position and in doing so expels the heel blank which drops into a suitable receptacle beneath. It will, of course, be understood that the contour of the plunger head conforms to the interior contour of the cutting die, as shown in Figure 4.

In order that the scrap rubber, from which the blanks have been severed, may be properly incorporated in the mass of plastic rubber at Y, out of which the calender rolls form the sheet supplied to the cutting dies, the feeding-in roll 18 should be set to exert substantial pressure upon the sheet of scrap that is fed between itself and the adjacent calender roll into the mass of plastic rubber Y. The adjustment provided by the adjusting screws operating upon this feeding-in roll enables the proper pressure to be exerted on sheets of different thickness.

What I claim is:

1. In a machine for dieing out heel blanks from a sheet rubber composition while in a plastic condition, the combination of a bed-roll arranged to receive the plastic sheet as formed by a calender, a revolving series of hollow blank-cutting dies mounted to have rolling contact with the periphery of said bed-roll to cut out blanks of approporiate size and contour from the interposed plastic sheet, yielding plungers fitting the contours of said dies and normally pressed outward to substantially flush relation with the cutting edges of their respective dies to exert a predetermined yielding pressure upon the opposed blank-forming areas of the sheet and acting to expel the severed blanks from the dies.

2. In a machine for dieing out heel blanks from plastic rubber sheet, the combination with a revoluble bed-roll, an opposed revoluble drum, a plurality of cutting dies mounted peripherally of said drum to form rolling contact with the bed-roll to cut out heel blanks from an interposed plastic sheet of rubber composition, a series of plungers corresponding to the interior cross sections of the dies mounted inside the dies, springs arranged to press said plungers outwardly to substantially flush relation with the cutting edges of the dies, whereby the plastic blanks are kept under predetermined pressure during the cutting operation and are thereafter expelled from their dies, and means for varying the spring tension against the plungers.

3. A machine for dieing out blanks from a sheet of rubber compound in a plastic condition embracing in combination a revoluble sheet-supporting bed roll, a revoluble die-carrying element, a plurality of hollow blank-cutting dies projecting outward beyond the periphery of said die-carrying element to have rolling contact with the bed-roll, a close fitting blank-compressing plunger movable inward under the pressure of a plastic sheet of rubber interposed between the plunger and the bed-roll, compression springs opposing a yielding resistance to the entire exposed face of the blank-forming portion of the sheet inside the die and acting to consolidate such blank-forming portions while they are being severed from the sheet, and to extrude into those portions of the rubber sheet, between the exterior walls of the dies, any excess material over the amount required to compactly fill the die to a predetermined depth, and adjustable tensioning and stop members for varying the tensioning of the compression springs and limiting the inward and outward movement of the compressing plungers.

In witness whereof, I have subscribed the above specification.

ARTHUR J. EDWARDS.